(12) United States Patent
Ross (10) Patent No.: US 12,135,836 B2
(45) Date of Patent: Nov. 5, 2024

(54) HANDS-FREE SWITCH SYSTEM

(71) Applicant: Hourglass Medical LLC, Monticello, IL (US)

(72) Inventor: Jeremy B. Ross, Monticello, IL (US)

(73) Assignee: Hourglass Medical LLC, Monticello, IL (US)

( * ) Notice: Subject to any disclaimer, the term of this patent is extended or adjusted under 35 U.S.C. 154(b) by 29 days.

(21) Appl. No.: 17/305,801

(22) Filed: Jul. 14, 2021

(65) Prior Publication Data

US 2021/0405751 A1    Dec. 30, 2021

Related U.S. Application Data

(63) Continuation of application No. 16/698,301, filed on Nov. 27, 2019, now Pat. No. 11,144,125, which is a continuation-in-part of application No. 16/202,601, filed on Nov. 28, 2018, now Pat. No. 11,002,437.

(60) Provisional application No. 62/775,482, filed on Dec. 5, 2018, provisional application No. 62/729,048, filed on Sep. 10, 2018, provisional application No. 62/596,046, filed on Dec. 7, 2017.

(51) Int. Cl.
  *G06F 3/01*  (2006.01)
  *A42B 3/04*  (2006.01)
  *A42B 3/30*  (2006.01)

(52) U.S. Cl.
  CPC .............. *G06F 3/015* (2013.01); *A42B 3/044* (2013.01); *A42B 3/303* (2013.01)

(58) Field of Classification Search
  CPC .......... A42B 3/303; A42B 3/044; G06F 3/015
  See application file for complete search history.

(56) References Cited

U.S. PATENT DOCUMENTS

| | | |
|---|---|---|
| 3,227,836 A | 1/1966 | Renwick, Sr. |
| 4,920,466 A | 4/1990 | Liu |
| 4,970,589 A | 11/1990 | Hanson et al. |
| 5,083,246 A | 1/1992 | Lambert |

(Continued)

FOREIGN PATENT DOCUMENTS

| | | |
|---|---|---|
| CA | 2268980 A1 | 4/1998 |
| CN | 208338996 U | 1/2019 |

(Continued)

OTHER PUBLICATIONS

International Search Report and Written Opinion mailed Jan. 25, 2022, from the ISA/European Patent Office, for International Application No. PCT/US2021/058209 (filed Nov. 5, 2021), 15 pgs.

(Continued)

*Primary Examiner* — Neil R Mikeska
(74) *Attorney, Agent, or Firm* — Ascenda Law Group, PC (57) ABSTRACT

A head-worn system has one or more illumination, imaging, communication, and/or other controlled elements electrically connected to a switch element (e.g., a piezo switch) positioned on the head-worn system so as to be overlying an area of a wearer's masseter muscle when worn on the wearer's person. The switch element is configured to be activated responsive to clenching of the wearer's jaw. The one or more controlled elements may be arranged to provide directional lighting/imaging from the point of view of the wearer, for example from the area of the wearer's zygomatic bones, when the head-worn system is worn on the wearer's person.

15 Claims, 8 Drawing Sheets

(56) References Cited

U.S. PATENT DOCUMENTS

| | | |
|---|---|---|
| 5,226,712 A | 7/1993 | Luca |
| 5,946,071 A | 8/1999 | Feldman |
| 5,951,141 A | 9/1999 | Bradley |
| 6,016,160 A | 1/2000 | Coombs et al. |
| 6,046,712 A | 4/2000 | Beller et al. |
| 6,126,294 A | 10/2000 | Koyama et al. |
| 6,560,029 B1 | 5/2003 | Dobbie et al. |
| 6,612,695 B2 | 9/2003 | Waters |
| 6,896,389 B1 | 5/2005 | Paul |
| 7,184,903 B1 | 2/2007 | Williams et al. |
| 7,303,303 B1 | 12/2007 | Haynes |
| 7,580,028 B2 | 8/2009 | Jeong et al. |
| 7,814,903 B2 | 10/2010 | Osborne et al. |
| 8,188,937 B1 | 5/2012 | Amafuji et al. |
| 8,337,014 B2 | 12/2012 | Kokonaski et al. |
| 8,587,514 B2 | 11/2013 | Lundstrom |
| 8,708,483 B2 | 4/2014 | Kokonaski et al. |
| 9,013,264 B2 | 4/2015 | Parshionikar et al. |
| 9,285,609 B1 | 3/2016 | Rost |
| 9,632,318 B2 | 4/2017 | Goto et al. |
| 10,477,298 B2 | 11/2019 | Cruz-Hernandez |
| 10,736,560 B2 | 8/2020 | Haugland et al. |
| 2002/0027777 A1 | 3/2002 | Takasu |
| 2002/0122014 A1 | 9/2002 | Rajasingham |
| 2003/0202341 A1* | 10/2003 | McClanahan ........ H04R 1/1083 362/105 |
| 2004/0008158 A1 | 1/2004 | Chi et al. |
| 2004/0136178 A1 | 7/2004 | Yu |
| 2004/0189930 A1 | 9/2004 | Skuro |
| 2004/0252487 A1 | 12/2004 | McCullough et al. |
| 2005/0102133 A1 | 5/2005 | Rees |
| 2005/0105285 A1 | 5/2005 | Maden |
| 2005/0226433 A1 | 10/2005 | McClanahan |
| 2006/0048286 A1 | 3/2006 | Donato |
| 2006/0061544 A1 | 3/2006 | Min et al. |
| 2006/0119539 A1 | 6/2006 | Kato et al. |
| 2006/0238878 A1 | 10/2006 | Miyake et al. |
| 2007/0243835 A1 | 10/2007 | Zhu et al. |
| 2007/0277819 A1* | 12/2007 | Osborne ................ A62B 18/08 128/201.19 |
| 2008/0216215 A1* | 9/2008 | Lee ........................ A42B 3/326 2/10 |
| 2009/0073082 A1 | 3/2009 | Yoshikawa |
| 2009/0187124 A1 | 7/2009 | Ludlow et al. |
| 2009/0251661 A1 | 10/2009 | Fuziak, Jr. |
| 2009/0267805 A1 | 10/2009 | Jin et al. |
| 2010/0014699 A1 | 1/2010 | Anderson et al. |
| 2010/0081895 A1 | 4/2010 | Zand |
| 2010/0177277 A1 | 7/2010 | Kokonaski et al. |
| 2010/0250231 A1* | 9/2010 | Almagro ................ G06F 40/58 704/2 |
| 2010/0271588 A1 | 10/2010 | Kokonaski et al. |
| 2010/0283412 A1 | 11/2010 | Baudou |
| 2010/0327028 A1 | 12/2010 | Nakabayashi et al. |
| 2011/0089207 A1 | 4/2011 | Tricoukes et al. |
| 2011/0221672 A1* | 9/2011 | Osterhout ............... G06Q 30/02 345/156 |
| 2011/0288445 A1 | 11/2011 | Lillydahl et al. |
| 2011/0317402 A1 | 12/2011 | Cristoforo |
| 2012/0002046 A1 | 1/2012 | Rapoport et al. |
| 2012/0052469 A1 | 3/2012 | Sobel et al. |
| 2012/0127420 A1 | 5/2012 | Blum et al. |
| 2012/0127423 A1 | 5/2012 | Blum et al. |
| 2012/0206323 A1 | 8/2012 | Osterhout et al. |
| 2012/0229248 A1 | 9/2012 | Parshionikar et al. |
| 2012/0242698 A1 | 9/2012 | Haddick et al. |
| 2012/0262667 A1 | 10/2012 | Willey |
| 2012/0287284 A1 | 11/2012 | Jacobsen et al. |
| 2012/0312669 A1 | 12/2012 | Breeds et al. |
| 2013/0016426 A1 | 1/2013 | Chiang |
| 2013/0201439 A1 | 8/2013 | Kokonaski et al. |
| 2013/0278881 A1 | 10/2013 | Kokonaski et al. |
| 2013/0300649 A1 | 11/2013 | Parkinson et al. |
| 2013/0329183 A1 | 12/2013 | Blum et al. |
| 2014/0000014 A1 | 1/2014 | Redpath et al. |
| 2014/0028966 A1 | 1/2014 | Blum et al. |
| 2014/0079257 A1 | 3/2014 | Ruwe et al. |
| 2014/0082587 A1 | 4/2014 | Delaney |
| 2014/0160250 A1 | 6/2014 | Pomerantz et al. |
| 2014/0249354 A1 | 9/2014 | Anderson et al. |
| 2014/0259287 A1 | 9/2014 | Waters et al. |
| 2014/0259319 A1* | 9/2014 | Ross ........................ A42B 3/18 2/424 |
| 2014/0354397 A1 | 12/2014 | Quintal, Jr. et al. |
| 2015/0094715 A1 | 4/2015 | Laufer et al. |
| 2015/0109769 A1 | 4/2015 | Chang |
| 2016/0054570 A1 | 2/2016 | Bosveld et al. |
| 2016/0178903 A1 | 6/2016 | Nakajima |
| 2016/0216519 A1 | 7/2016 | Park et al. |
| 2016/0255305 A1* | 9/2016 | Ritchey ................... H04N 7/15 348/14.03 |
| 2016/0313801 A1 | 10/2016 | Wagner et al. |
| 2016/0316181 A1 | 10/2016 | Hamra |
| 2017/0075198 A1 | 3/2017 | Kuroki |
| 2017/0215717 A1 | 8/2017 | Orringer et al. |
| 2017/0227780 A1 | 8/2017 | Tatsuta et al. |
| 2017/0257723 A1 | 9/2017 | Morishita et al. |
| 2017/0270820 A1 | 9/2017 | Ashby |
| 2017/0322641 A1 | 11/2017 | Osterhout |
| 2018/0003764 A1 | 1/2018 | Menon et al. |
| 2018/0242908 A1 | 8/2018 | Sazonov et al. |
| 2019/0142349 A1 | 5/2019 | Schorey et al. |
| 2019/0178476 A1 | 6/2019 | Ross |
| 2019/0178477 A1 | 6/2019 | Ross |
| 2019/0265802 A1 | 8/2019 | Parshionikar |
| 2020/0059467 A1 | 2/2020 | Chereshnev |
| 2020/0072596 A1 | 3/2020 | Pang et al. |
| 2020/0097084 A1 | 3/2020 | Ross |
| 2020/0249752 A1 | 8/2020 | Parshionikar |
| 2020/0285080 A1 | 9/2020 | Belli et al. |
| 2020/0320412 A1 | 10/2020 | Gillian et al. |
| 2021/0029435 A1 | 1/2021 | Siahaan et al. |

FOREIGN PATENT DOCUMENTS

| | | |
|---|---|---|
| DE | 10 2006 015334 A1 | 10/2007 |
| EP | 1 928 296 B1 | 5/2011 |
| FR | 2832906 A1 | 6/2003 |
| JP | 2002268815 A | 9/2002 |
| JP | 2009116609 A | 5/2009 |
| WO | 96/37730 A1 | 11/1996 |
| WO | 2004/087258 A1 | 10/2004 |
| WO | 2009/133258 A1 | 11/2009 |
| WO | 2010/062479 A1 | 6/2010 |
| WO | 2014/068371 A1 | 5/2014 |
| WO | 2015/124937 A1 | 8/2015 |
| WO | 2017/065663 A1 | 4/2017 |
| WO | 2020/117597 A1 | 6/2020 |
| WO | 2020/248778 A1 | 12/2020 |
| WO | 2022/098973 A1 | 5/2022 |

OTHER PUBLICATIONS

Etani, Takehito, "The Masticator", The Masticator: the social mastication (2016), downloaded from: http://www.takehitoetani.com/masticator, 5 pages.

International Preliminary Report on Patentability mailed Aug. 4, 2020, from the IPEA/US, for International Application No. PCT/US2018/062767 (filed Nov. 28, 2018), 18 pgs.

International Search Report and Written Opinion mailed Mar. 5, 2019, from the ISA/US, for International Application No. PCT/US18/62767 (filed Nov. 28, 2018), 15 pages.

Invitation to Pay Additional Fees and Partial Search mailed Mar. 4, 2020, from the ISA/European Patent Office, for International Patent Application No. PCT/US2019/063717 (filed Nov. 27, 2019), 15 pages.

Goel, Mayank; et al., "Tongue-in-Cheek: Using Wireless Signals to Enable Non-Intrusive and Flexible Facial Gestures Detection", HMDs & WEarables to Overcome Disabilities, CHI 2015, Apr. 18-23, 2015, Crossings, Seoul, Korea, pp. 255-258.

(56) References Cited

OTHER PUBLICATIONS

Von Rosenberg; et al., "Smart helmet: Monitoring brain, cardiac and respiratory activity," 2015 37th Annual International Conference of the IEEE Engineering in Medicine and Biology Society (EM BC), Milan, 2015, pp. 1829-1832, NPL001 (Year: 2015).
Xu; et al., "Clench Interaction: Novel Biting Input Techniques", Human Factors in Computing Systems Proceedings (CHI 2019), May 4-9, 2019, 12 pages.
International Search Report and Written Opinion mailed May 13, 2020, from the ISA/European Patent Office, for International Application No. PCT/US2019/063717 (filed Nov. 27, 2019), 16 pgs.
Khoshnam; et al., "Hands-Free EEG-Based Control of a Computer Interface Based on Online Detection of Clenching of Jaw", International Conference on Bioinformatics and Biomedical Engineering, IWBBIO 2017, Part I, Lecture Notes in Computer Science book series (LNCS, vol. 10208), pp. 497-507.
Tato-Klesa, Hella, "Detection of Teeth Grinding and Clenching using Surface Electromyography", Master's thesis, Jul. 29, 2020, Technische Universitat Munchen, Munich, Germany, 72 pgs.
Matthew Temndrup, "Wiggle your nose to control VR experiences with Reach Bionics," Upload VR (Jan. 12, 2016) (Available at https://uploadvr.com/reach-bionics-lets-you-control-vr-experiences-by-wiggling-your-nose/).
R. Benjamin Knapp, "Biosignal Processing in Virtual Reality Applications," Cal. State University Northridge Center on Disabilities Virtual Reality Conference 1993 (1993) (available at http://www.csun.edu/~hfdss006/conf/1993/proceedings/BIOSIG~1.htm).
International Preliminary Report on Patentability mailed Mar. 3, 2021, from the IPEA/US, for International Patent Application No. PCT/US2019/063717 (filed Nov. 27, 2019), 6 pgs.
International Search Report and Written Opinion mailed Apr. 20, 2022, from the ISA/European Patent Office, for International Patent Application No. PCT/US2022/012746 (filed Jan. 18, 2022), 15 pgs.
International Search Report and Written Opinion mailed Oct. 20, 2021, from the ISA/European Patent Office, for International Application No. PCT/US2021/039395 (filed Jun. 28, 2021), 14 pgs.
International Search Report and Written Opinion mailed Jul. 26, 2022, from the ISA/European Patent Office, for International Patent Application No. PCT/US2022/025324 (filed Apr. 19, 2022), 13 pgs.
International Preliminary Report on Patentability mailed Jan. 12, 2023, from The International Bureau of WIPO, for International Patent Application No. PCT/US2021/039395 (filed Jun. 28, 2021), 11 pgs.
Office Action dated Apr. 24, 2023, for U.S. Appl. No. 18/146,087, filed Dec. 23, 2022, 11 pgs.
Communication pursuant to Article 94(3) EPC dated Apr. 28, 2023, from the European Patent Office, for European Patent Application No. 19827960.6, 7 pgs.
Gu; et al. "Efficacy of biofeedback therapy via a mini wireless device on sleep bruxism contrasted with occlusal splint: a pilot study", Journal of Biomedical Research, 2015, 29(2):160-168.
"detent", Merriam-Webster, definition, downloaded Jan. 23, 2024, from https://www.merriam-webster.com/dictionary/detent, 14 pgs.
International Search Report and Written Opinion mailed Jan. 22, 2024, from the ISA/US, for International Application No. PCT/US23/32656 (filed Sep. 13, 2023), 13 pgs.

* cited by examiner

HANDS-FREE SWITCH SYSTEM

RELATED APPLICATIONS

This is a CONTINUATION of U.S. application Ser. No. 16/698,301, filed Nov. 27, 2019, which is a NONPROVISIONAL of, incorporates by reference, and claims priority to U.S. Provisional Application No. 62/775,482, filed Dec. 5, 2018, and is also a CONTINUATION-IN-PART of and incorporates by reference U.S. application Ser. No. 16/202,601, filed Nov. 28, 2018, which claims the priority benefit of U.S. Provisional Applications 62/596,046, filed Dec. 7, 2017, and 62/729,048, filed Sep. 10, 2018, each of which are also incorporated by reference herein.

FIELD OF THE INVENTION

The present invention relates to systems and methods for hands-free activation/deactivation of illumination and/or other systems, in particular, head-worn illumination and/or imaging systems.

BACKGROUND

It is common for aviators, especially those operating military fixed-wing aircraft, to wear respiration systems that include a mask and for such masks to include therein control switches that can be manipulated by the wearer using his/her lip or tongue. For example, U.S. Pat. No. 7,184,903 describes a hands-free, mouth-activated switch disposed within a cup-shaped, rigid portion of a pilot's oxygen mask. Among the elements controllable by such a switch is a night vision compatible light.

While such systems are common, they do not provide complete solutions for an entire aircraft crew. For example, not all crew members may wear or even have access to oxygen masks or such masks as include these types of switches. Moreover, it is highly unusual for civilian aircraft crews to have such masks as employ mouth-activated switches. Even if the mask-fitted, mouth-activated switches are employed, use thereof demands that the mask be worn. This would not be typical of flight crew members when embarking or disembarking the aircraft. Hence, the associated controlled systems (e.g., illumination systems) are predictably unavailable for use during these activities.

SUMMARY OF THE INVENTION

Embodiments of the invention include a head-worn system having one or more illumination, communication, and/or other controlled elements electrically connected to a switch element (e.g., a piezo switch), said switch element positioned on the head-worn system so as to be overlying an area of a wearer's masseter muscle when worn on the wearer's person, and said switch element configured to be activated responsive to clenching of the wearer's jaw. In some instances, the switch (or additional switches) may be positioned in locations other than over the wearer's masseter muscles, allowing activation/deactivation by means of muscles associated with a wearer's eyebrow, temple, etc. The electrical connection may be wired or wireless. The one or more illumination elements may be supported on one or more booms attached to a frame to provide directional lighting from an area of the wearer's zygomatic bones when the head-worn system is worn on the wearer's person. Alternatively, the one or more illumination elements may be integrated as part of or attached to a headset. The switch element may be positioned at an end of a clip mounted to an earphone cup of the headset. The clip may be mounted to the earphone cup by a band about a circumference of the earphone cup. Alternatively, the clip may be mounted to the earphone cup by a mounting plate affixed to the earphone cup. The one or more illumination elements may be light emitting diodes (LEDs), for example which may emit light in more than one wavelength. Alternatively, the one or more illumination elements may be LEDs and different ones of the LEDs may emit light in different wavelengths. The head-worn system may also include one or more imaging devices.

The head-worn system may be arranged so that at least one of the one or more illumination elements is supported on a boom attached to a frame and the boom may further support at least one imaging device. The boom may be positioned relative to the frame so as to provide directional lighting from an area of the wearer's zygomatic bones when the head-worn system is worn on the wearer's person. Alternatively, at least one of the one or more illumination elements may be supported on a first boom attached to a frame and the head-worn system may further include a second boom attached to the frame, the second boom having at least one imaging device supported thereon.

The switch element may be electrically connected to the one or more illumination elements via a controller and the controller configured to activate and/or deactivate the one or more illumination elements responsively to different ones of multi-actuations of the switch element.

Another embodiment of the invention provides an actuator element for a hand-free switch system, said actuator element comprising a bracket and a piezo switch attached to a moveable portion of said bracket, said bracket including a mounting portion for affixing said bracket to a head-worn unit, and said moveable portion of said bracket being hingibly coupled to the mounting portion of the bracket.

Another embodiment of the invention provides a helmet having an illumination unit and a switch element electrically coupled to said illumination unit, said switch element positioned on the helmet so as to be overlying an area of a wearer's masseter muscle when the helmet is worn on the wearer's person, and said switch element configured to be activated responsive to clenching of the wearer's jaw. The illumination unit may be pivotably connected to the helmet. The illumination unit may include one or more LEDs. And, the helmet may further include one or more imaging devices.

Another embodiment of the invention provides a hands-free switching system, having a switch configured to be worn adjacent an outside part of a wearer's face and to be activated by a jaw clench of the wearer, said switch electrically connected to provide an output to a controller that includes a processor and an associated memory, said memory storing instructions for execution by the processor, and a lighting element, wherein said instructions, when executed by said processor, cause said processor to recognize a first sequence of pulses from the switch as indicating one or a number of commands for illuminating the lighting element. The hands-free switching system may also include an imaging unit and said instructions, when executed by said processor, may cause said processor to recognize a second sequence of pulses from the switch as indicating one or a number of commands for operating the imaging unit.

Still another embodiment of the invention may provide a head-worn device having a jaw clench-actuated interface configured to operate one or more illumination and/or imaging units of the head-worn device to provide directional lighting/imaging from an area of a wearer's zygomatic bones. The illumination units may be independently adjustable light sources (e.g., LEDs) that allow for illumination of two or more areas simultaneously. The independently adjustable light sources may allow for illumination of the two or more areas at two or more separate wavelengths. The jaw clench-actuated interface may include a piezo switch positioned on a boom so as to be near the face of the wearer, overlying an area of the wearer's masseter muscle, when the head-worn device is worn by the wearer.

A further embodiment of the invention provides a head-worn interface unit having a cursor control switch for a computer system, the cursor control switch positioned on the head-worn interface unit so as to be overlying an area of a wearer's masseter muscle when worn on the wearer's person, said cursor control switch configured to be activated responsive to clenching of the wearer's jaw, and a wireless communication interface configured to communicatively couple the cursor control switch to an input of a computer system via a wireless communication protocol.

These and still more embodiments of the invention are described in detail below with reference to the accompanying drawings.

BRIEF DESCRIPTION OF THE DRAWINGS

The present invention is illustrated by way of example, and not limitation, in the figures of the accompanying drawings, in which.

DETAILED DESCRIPTION

Described herein are systems and methods for hands-free activation/deactivation of illumination and/or other systems, for example, head-worn illumination and/or imaging systems. These systems and methods are characterized, in part, by employing a switch element, e.g., a piezo switch, that is positioned on or near the face of a user, overlying the area of the user's masseter muscle so that clenching/flexing of the jaw activates the switch. In one embodiment, the switch element is employed in combination with a head-mounted illumination device suitable for application in a variety of contexts, including military, law enforcement, health care, and others (e.g., consumer). Unlike helmet-mounted lights, which require the user to wear a helmet in order to use them, illumination devices configured in accordance with embodiments of the present invention can be worn with or without a helmet or other eyewear, communication devices, visioning systems, etc. Such illumination devices provide directional lighting from the area of the user's zygomatic bones. Placing the light source in this vicinity reduces light-blinding of others when communicating. Additionally, the use of one, two (left-side and right-side), or more independently adjustable light sources allows for illumination of one, two, or more areas simultaneously. The use of the switch element overlying the area of the user's masseter muscle so that clenching/flexing of the jaw activates the switch allows for hand-free operation of the light sources (either individually, in combination, or collectively). Other embodiments of the invention make use of the switch element as part of other head-worn illumination, imaging, and/or communication systems.

The use of "clench interactions" has been recognized as a viable control technique. For example, subsequent to the filing of the present applicant's U.S. Provisional Application No. 62/775,482, Xu et al., "Clench Interaction: Novel Biting Input Techniques," Proc. 2019 CHI Conference on Human Factors in Computing Systems (CHI 2019), May 4-9, 2019, Glasgow, Scotland UK, reported on the use of different levels of bite force as a means of human-computer interaction. In doing so, they reviewed the existing literature and found research exploring tongue-based interfaces and tooth-click interfaces. Bite force measures, that is the level of force applied between one's teeth by and during clench interactions, were proposed as an extension to the existing works in this area.

While bite force interfaces may afford some advantages in some applications, the present invention adopts a different approach inasmuch as it relies on sensors placed outside a user's oral cavity. Such sensors are more suitable for applications in which different users may employ a common head-worn illumination/imaging device at different times, and/or where the presence of sensors inside one's mouth may be uncomfortable or impractical.

Figure 1:
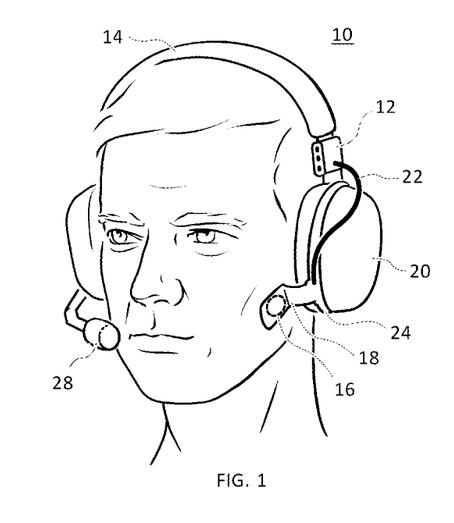
FIG. 1 illustrates an example of a hands-free switch system configured in accordance with an embodiment of the present invention.
Figure 2:
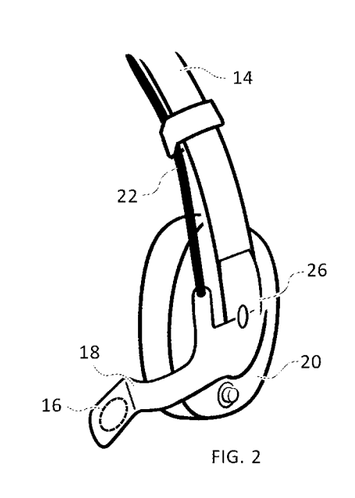
FIG. 2 illustrates another example of a hands-free switch system configured in accordance with an embodiment of the present invention.

Referring to FIG. 1, an example of a hands-free switch system 10 configured in accordance with an embodiment of the present invention is illustrated. In this example, the system includes a lighting element 12, integrated as part of or attached to a headset 14, and a switch 16 positioned at the end of a clip 18 that is mounted to an earphone cup 20 of the headset. The switch 16 is positioned so as to be flush against the wearer's face (or nearly so), over the masseter muscle so that clenching/flexing of the jaw activates the switch. Not shown in the illustration are power supply and control electronics for the hands-free switch system, which elements may be incorporated within the earphone cup 20 or elsewhere. The switch 16 is electrically connected to the control electronics and/or the lighting element 12 via a connector 22. In the arrangement shown in FIG. 1, the clip 18 is mounted to the earphone cup 20 by means of a band 24 about the circumference of the earphone cup. In the alternative arrangement shown in FIG. 2, the clip 18 is mounted to the earphone cup 20 by means of a mounting plate 26 affixed to the earphone cup using a screw, rivet, or other attachment means.

As should be immediately apparent from these illustrations, use of the lighting element 12 or other illumination, imaging, or communications system(s) by means of switch 16 does not require donning a mask. Instead, the lighting element 12 (or other illumination, imaging, or communications system(s)) can be controlled using switch 16 at any time the headset 14 is worn. Wearing such headsets would typically be the norm for any member of an aircraft flight or operations crew, even when embarking/disembarking the aircraft. Indeed, headsets such as the one illustrated in these figures are not restricted to use by flight/aircraft crews and may be employed by ground forces, naval/coast guard personnel, and civilians. For example, headsets such as the ones shown in FIGS. 1 and 2 may be employed by workers in and around constructions sites, sports arenas, film and television production locations, amusement parks, and many other locations. Often in these locations, especially at night, the need for personal illumination and/or imaging equipment arises. By employing headgear equipped with lighting element 12 (or other illumination, imaging, or communications system(s)) and switch 16, wearers thereof have ready access to same and can activate/deactivate the lighting element (or other illumination, imaging, or communications system(s)) in a hands-free fashion. Note that although FIG. 1 illustrates a headset 14 with both left and right earphone cups, this is for purposes of example only and the present hands-free switch system may be used with headsets having only a single earphone cup, or one or two earpieces. Indeed, the present hands-free switch system may be used even with headgear that does not include any earphones or earpieces, for example attached to a band worn on the head or neck, or, as described below, on a boom of a personal lighting system.

In various embodiments, the lighting element 12 may consist of one or more light emitting diodes (LEDs), which emit light in one or more wavelengths. Further, the lighting element may include, in addition to one or more LEDs, one or more cameras for digital still and/or video imaging. In some instances, a lighting element may be worn on one side of the headset 14 while an imaging system is worn on the opposite side, each being controlled by separate switches 16 mounted on respective opposite sides of the headset, or by a single switch 16, which lighting and illumination systems are responsive (under the control of a controller) to multi-actuations of switch 16, similar to the way computer cursor control devices (e.g., touch pads, mice, etc.) may be separately responsive to single, double, triple, or other multiple clicks.

Indeed, the switch 16 may itself be used to control a cursor as part of a user-computer interface. For example, any or all of cursor type, cursor movement, and cursor selection may be controlled using a switch 16 positioned so as to be flush against the wearer's face (or nearly so), over the area of the masseter muscle so that clenching/flexing of the jaw activates the switch. Applications for such uses include computer gaming interfaces, which today commonly include head-worn communication equipment. One or more switches 16 configured in accordance with embodiments of the invention may be fitted to such headgear (either when manufactured or as an after-market addition) to provide cursor control capabilities. Conventional Bluetooth or other wired or wireless communication means may be employed to provide a connection to a console, personal computer, tablet, mobile phone, or other device that serves as the gaming or other host. The use of such human-machine interfaces may find particular application for users that have no or limited use of their hands and afford them a convenient means of interacting with a personal computer, tablet, mobile phone, or similar device.

Further, the element(s) that is/are under control of switch 16 may include one or more microphones. Such microphones may be boom mounted, as shown by microphone 28 in FIG. 1, or may be integral to the headset and make use of bone conduction transducers for transmission of audio signals. Alternatively, or in addition, switch 16 may be used to adjust the presence, absence, and/or volume of audio played through one or both of the earphones 20 or another earpiece. Also, a switch 16 may be used to control off-headset equipment. For example, switch 16 may be associated with a wireless transmitter in or on headset 14, which transmitter is used to provide commands to an off-headset piece of equipment via an associated receiver. Any of a number of wireless communication protocols, and associated compliant transmitters and receivers, may be used for such a purpose, for example Bluetooth, ZigBee, BLE, Z-Wave, Thread, Wi-Fi, HaLow, SigFox, Dash7, etc. As mentioned, such an arrangement may be especially useful where the switch 16 is used to control one or more aspects of a video game system, as part of a gaming headset. Or, in such environments, switch 16 may be associated with a muting function for the headset so that a user may better pay attention to his or her parents as they impart life skills advice.

In general, switch 16 is a device that requires little or no mechanical displacement of a control element in order to signal or effect a change (or desired change) in state of a controlled system. One example of such a device is a piezo switch, such as the Piezo Proximity Sensor produced by Communicate AT Pty Ltd. of Dee Why, Australia. Piezo switches generally have an on/off output state responsive to electrical pulses generated by a piezoelectric element. The electrical pulse is produced when the piezoelectric element is placed under stress, for example as a result of compressive forces resulting from a wearer clenching his/her jaw so that pressure is exerted against the switch 16 at the end of clip 18. Although the pulse is produced only when the compressive force is present (e.g., when the wearer's jaw is clenched), additional circuitry may be provided so that the output state of the switch is maintained in either an "on" or an "off" state until a second actuation of the switch occurs. For example, a flip-flop may be used to maintain a switch output logic high or logic low, with state changes occurring as a result of sequential input pulses from the piezoelectric element. One advantage of such a piezo switch is that there are no moving parts (other than a front plate that must deform by a few micrometers each time a wearer's jaw is clenched) and the entire switch can be sealed against the environment, making it especially useful for marine and/or outdoor applications.

Other embodiments may employ a switch 16 that is a micro tactile switch. Although tactile switches employ mechanical elements subject to wear, for some applications they may be more appropriate than piezo switches because they provide mechanical feedback to the user (although haptic feedback incorporated with a piezo switch may also provide an acceptable level of feedback for a user and so may be incorporated in the above-described embodiment). This feedback can provide assurance that the switch 16 has been activated/deactivated. Momentary contact tactile switches may also be used, but because they require continual force (e.g., as provided by clenching one's jaw against the switch), they are best suited to applications where only a momentary or short engagement of the active element under the control of switch 16 is desired, for example, signal light flashes, burst transmissions, or other short duration applications, or where a flip flop is used to maintain an output state until a subsequent input is received, as discussed above. Other forms of switches 16 include a ribbon switch (e.g., as made by Tapeswitch Corporation of Farmingdale, NY) and conductive printed circuit board surface elements activated via carbon pucks on an overlaid keypad.

Figure 3:
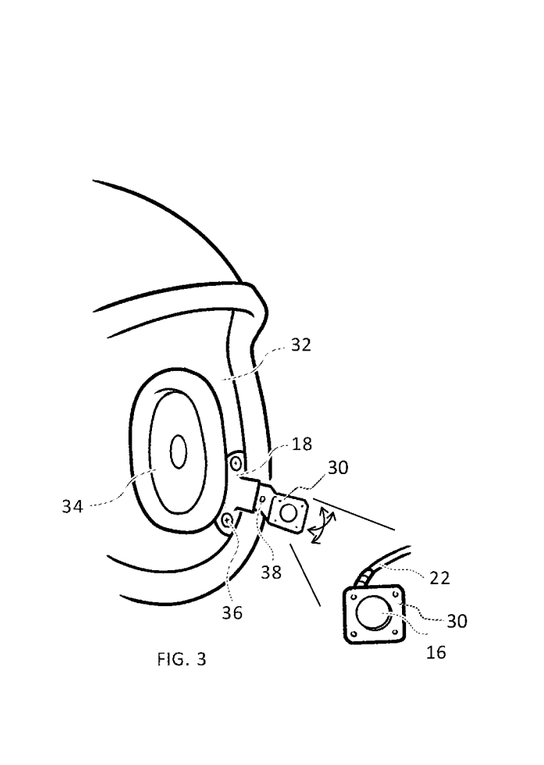
FIG. 3 illustrates yet another example of a hands-free switch system configured in accordance with an embodiment of the present invention.
Figure 4:
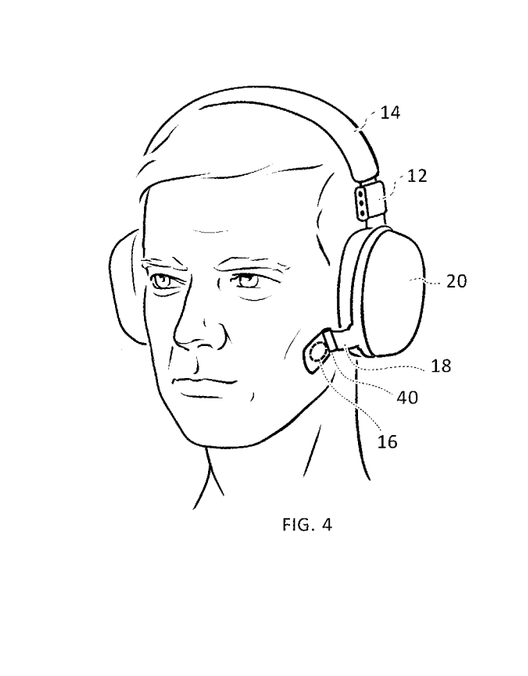
FIG. 4 illustrates still a further example of a hands-free switch system configured in accordance with an embodiment of the present invention.

Turning now to FIG. 3, which show an interior view of a helmet 32 having one or more integral ear cup 34, a further example of a hands-free switch 16 is shown in the enlarged view at right. In some embodiments, the switch 16 may be attached to or integrated in a moveable portion 30 of clip 18. In this arrangement, clip 18 includes a bracket that mounts to helmet 32 using one or more screws 36. The moveable portion 30 is rotatable about a rivet or pin 38 and may also be flexible so as to be moved adjacent to or away from a wearer's face. This is useful to prevent unwanted actuations of switch 16 and its associated equipment. Alternatively, the moveable portion 30 may be hingibly attached to the bracket so that it can be moved away from or adjacent to the wearer's face. Such a hinge arrangement may include a spring-loaded hinge that keeps the switch against the wearer's face even when the wearer moves his/her head within the helmet unless moved away from the wearer's face by an amount sufficient to engage a detent that prevents return to a position adjacent a wearer's face unless manually adjusted by the wearer. The hingible arrangement of switch 16 may also be used with headset 14, as shown in FIG. 4. Hinge 40 may be a spring-loaded hinge of any type, for example a spring-loaded plano hinge, butt hinge, barrel hinge, butterfly hinge, pivot hinge, or other arrangement.

Figure 5:
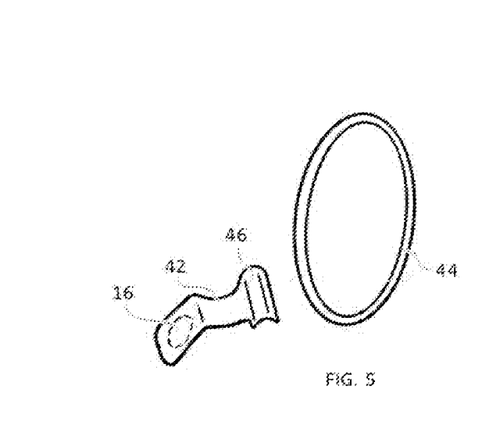
FIG. 5-8 illustrate examples of arranges for securing an actuator element of a hands-free switch system to a headset earphone cup or other mount in accordance with embodiments of the present invention.
Figure 6:
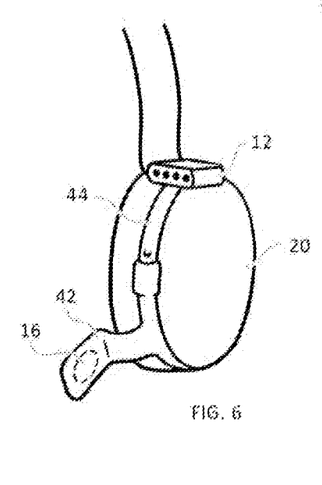

The hands-free switch 16 may be fashioned as an integral component of an actuator element 42, as shown in FIG. 5. Actuator element 42 may be a molded part with a groove 46 adapted to receive a rubber band or O-ring 44 as a means of securing the actuator to an earphone 20 of a headset, as shown in FIG. 6. FIG. 6 also shows an alternative orientation of the lighting element 12 on top of the earphone 20.

Figure 7:
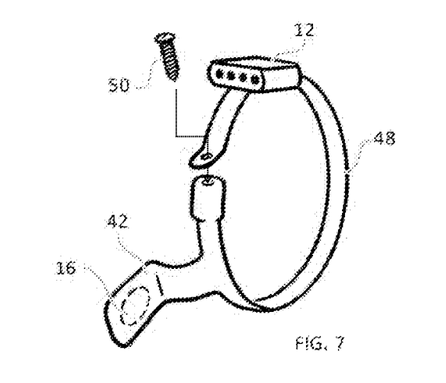
Figure 8:
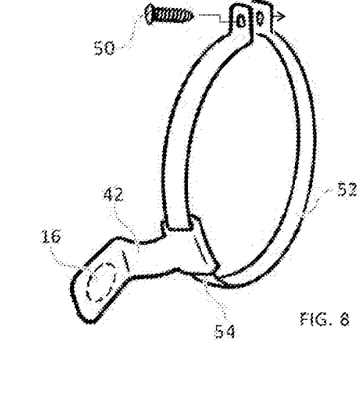

FIGS. 7 and 8 show further alternative mounting arrangements for an actuator element 42 and associated switch 16. In FIG. 7, the actuator element 42 is included as an integral component of a molded plastic or other band 48 that is securable about the circumference of an earphone by means of screw 50. In FIG. 8, a metal band 52 which is securable about the circumference of an earphone by means of screw 50 is passed through an opening 54 in actuator element 42 thereby allowing the position of actuator element 42 to be slideably adjusted along the band 52 to accommodate different wearers.

Two-piece designs such as those illustrated in FIGS. 5 and 8 are advantageous in that they can accommodate various equipment types or sizes, such as different types or sizes of earphones 20, and/or wearers with different sized heads. By allowing the actuator module 42 with the switch 16 to be moved with respect to a securing band 44, 54, the position of the switch can be adjusted for a particular user. Further, the actuator element 42 may have a telescoping slide so as to allow the displacement of the switch 16 away from the securing band to be altered, thereby accommodating even a wider range of equipment types or sizes and/or wearer's head sizes and shapes. In some instances, the switch may be positioned in locations other than over the wearer's jaw muscles, allowing activation/deactivation by means of muscles associated with a wearer's eyebrow, temple, etc.

Figure 9:
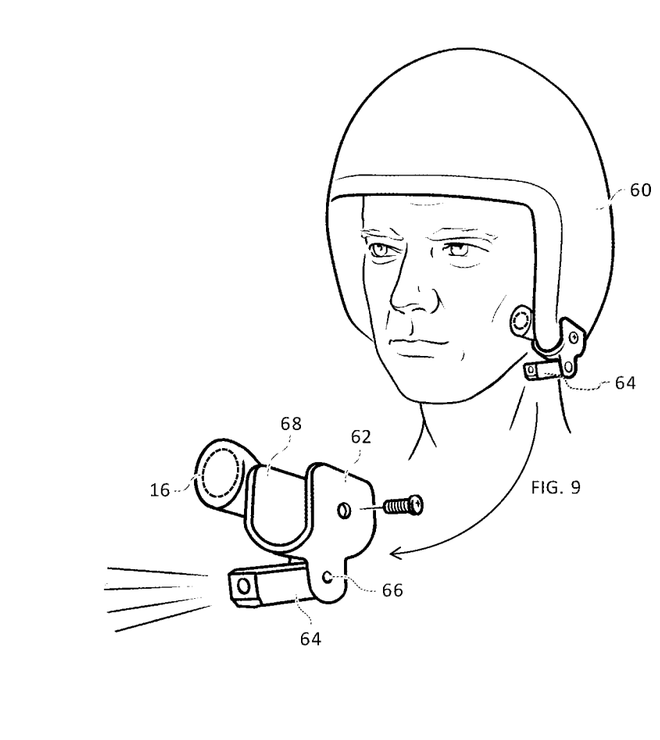
FIGS. 9 and 10 illustrate examples of hands-free switch systems for use with pilot helmets in accordance with embodiments of the present invention.
Figure 10:
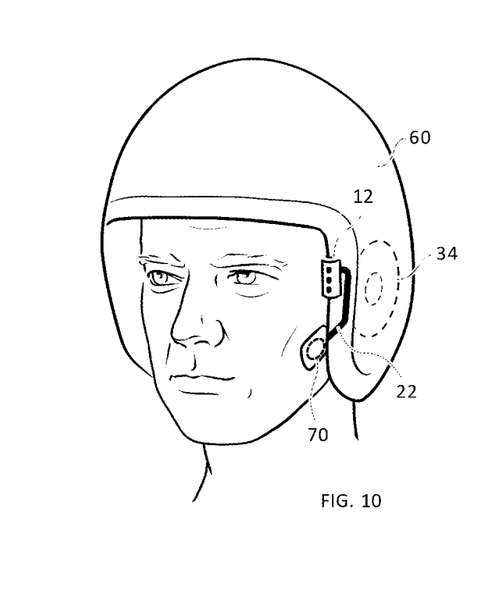

Referring now to FIGS. 9 and 10, the present hands-free switching system may also be employed as a component of a pilot's or other's helmet 60. In FIG. 9, a one-piece, clamp-on configuration of an integrated switch and light unit 62 is shown. The unit 62 may be secured to helmet 60 (e.g., near a bottom forward edge thereof) by means of a cupped bracket 68 and one or more screws. The unit 62 includes both a switch 16 of the kind described above, and a pivotably connected illumination unit 64. Illumination unit 64 is adjustable about a mounting pin or rivet 66, thus, the wearer can position the illumination unit so as to direct light where it is needed. In addition to or in lieu of an illumination unit 64 (which may include one or more LEDs), an imaging unit (e.g., a digital still or movie camera) may be included in the unit. In some instances, an illumination unit may be worn on one side of helmet 60 and an imaging unit worn on the other, and each may be controlled by respective, independent switches 16 or by a single switch 16 through different sequences of activation operations.

In FIG. 10, the actuator element 70 with integral switch is mounted as an integral unit of helmet 60 and attached via cable 22 to an illumination element 12 that is likewise secured to helmet 60. The illumination element 12 may be positioned approximately in line with the wearer's eyeline when the helmet is worn so that the light provided thereby is always directed to the area the wearer is looking. The actuator 70 is positioned on the helmet so that the switch is positioned over the wearer's jaw and may be integrated as part of the flexible ear seal around ear cup 34 within the helmet.

Figure 11:
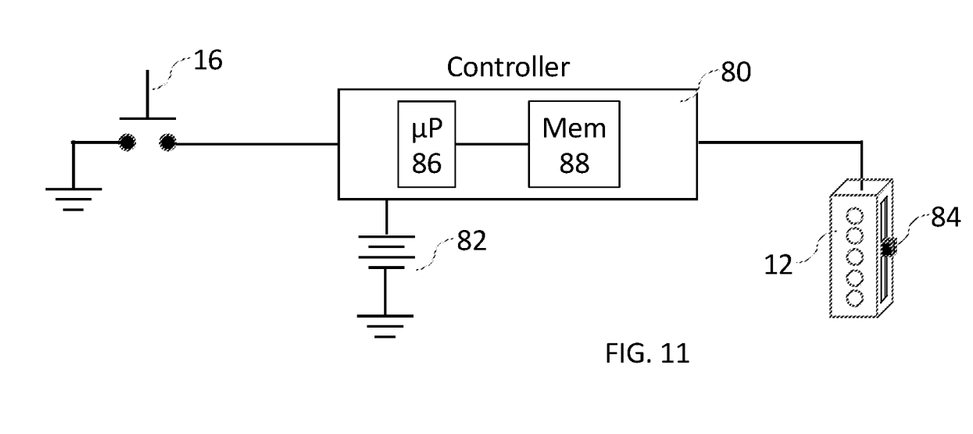
FIG. 11 present a simplified schematic of a hands-free switching system configured in accordance with an embodiment of the invention.

FIG. 11 present a simplified schematic of a hands-free switching system configured in accordance with an embodiment of the invention. In this example, switch 16 is illustrated as a push button or momentary contact switch of the kind described above, and provides an output to controller 80. Controller 80 includes a processor 86 and an associated memory 88, which stores instructions for execution by processor 86. Not illustrated in detail are other components of controller 80. A power supply 82, e.g., a battery, is provided and, as indicated above, the controller 80 and battery 82 may be integrated in a headset earphone of a headset or be included elsewhere in a headset of which the hands-free switching system is a part.

In this example, a lighting element 12 is illustrated, however, in other instances this unit may be another form of illumination, imaging, or communications system. Associated with lighting element 12 is a slide switch or rocker switch 84 having a plurality of operation positions. According to a current operation position of switch 84, the lighting element may be "off," "on," or under control of switch 16. When in this third position, firmware stored in memory 88 may cause processor 86 to recognize a sequence of pulses from switch 16 as indicating one or a number of commands for lighting element 12. For example, processor 86 may be programmed to ignore single presses of switch 16 and only accept as valid command inputs two pulses of switch 16 which occur within a prescribed time of one another (i.e., a "double click" of switch 16). Alternatively, or in addition, triple clicks may be recognized as valid command inputs, which may signify a different command than a double click. Further multiple clicks and/or click-and-hold inputs may also be recognized as signifying different commands. Such multi-click commands are useful for eliminating unintentional actuations of switch 16, as may be occasioned by involuntary muscle movements or by a wearer chewing food, gum, etc., or clenching his/her jaw during a flight operation. Valid forms of commands may be used to turn on/off the lighting element 12 and/or individual LEDs thereof, adjust the intensity of one or more illuminated LEDs, or to signal other desired operations. In general, switch 16 actuation sequence timings, repetitions, and durations may each be used, individually and/or in combination to specify different command inputs for one or more controlled elements such as lighting element 12 and/or an imaging unit.

The processor 86 may also communicate with and control other peripherals, such as a heads-up display, audio input/output unit, off-headset unit, etc. Processor 86 is a hardware-implemented module and may be a general-purpose processor, or dedicated circuitry or logic, such as a field programmable gate array (FPGA) or an application-specific integrated circuit (ASIC)), or other form of processing unit. Memory 88 may be a readable/writeable memory, such as an electrically erasable programmable read-only memory, or other storage device.

FIGS. 12A-12E illustrate further examples of head-worn illumination/imaging devices 90 configured with clench-based interfaces in accordance with embodiments of the present invention. Unlike helmet-mounted lights, which require the user to wear a helmet in order to use them, illumination/imaging devices 90 can be worn with or without a helmet or other eyewear, communication devices, visioning systems, etc. In particular, illumination/imaging devices 90 provide directional lighting/imaging from the area of the user's zygomatic bones. Placing a light source in this vicinity reduces light-blinding of others when communicating. Additionally, while the device may include only a single lighting element, the use of two (left-side and right-side) or more, independently adjustable light sources allows for illumination of two or more areas simultaneously, at two or more separate wavelengths, if desired.

In addition to lighting, the frame 100 of the present devices provide a platform for image and/or video capture and/or projection devices, for example as may be used with a helmet-worn or other heads-up display. Further, one or more microphones may be provided integral to or on the frame and/or on a boom associated with the frame that supports the illumination units. Hands-free operation of the illumination/imaging device 90 may be facilitated using a switch element 102, e.g., a piezo switch, that is positioned on a boom 104 so as to be near the face of a user, overlying the area of the user's masseter muscle so that clenching/flexing of the jaw activates the switch.

As shown in these illustrations, individual illumination elements, e.g., light emitting diodes (LEDs) 106, are included on or in a frame 100, which is worn over the ears and behind the head, and which may include an optional retracting head strap 110 connecting the two sides of the frame. At the front of the frame are located one or more booms 108 that extend over a portion of the wearer's face, below the eyes, and terminate in the area of the zygomatic bones. Two such booms, one each on the left side and right side of the wearer's face are shown in the illustrations, however, embodiments of the invention may provide just a single such boom on one side of the wearer's face, or multiple such booms on each side of the wearer's face. For some specialized applications it may be desirable to have different numbers of booms on each side of a wearer's face. The booms may or may not contact the wearer's face and may include a rubberized or other backing to provide a comfortable surface against the wearer's cheek.

Each of the booms 108 terminates with a hinged panel 112. The hinged panels are swivelly mounted to the booms, e.g., with a plano hinge, butt hinge, barrel hinge, butterfly hinge, pivot hinge, spring hinge, or other arrangement, and may be detachable from the boom so as to be replaceable/reconfigurable. For example, different arrangements of hinged panels 112 may be adapted to carry different illumination devices, sensors, imaging devices, and/or projection devices. In some examples, hinged panels 112 may be adapted for carrying LEDs that emit light in the visible spectrum. Other forms of hinged panels 112 may be adapted to carry LEDs that emit light in other wavelengths, in addition to or in lieu of the LEDs that emit light in the visible spectrum. Still further forms of hinged panels 112 may be adapted to carry light detectors and/or imaging devices (e.g., still image and/or video cameras), in addition to or in lieu of the LEDs that emit light in the visible spectrum. Also, as discussed below, some hinged panels 112 may be adapted to carry LEDs that emit light as well as image/video projectors for use with a heads-up display or other imaging system. Although the majority of the remaining discussion focuses on hinged panels adapted to carry LEDs that emit light in the visible spectrum, this discussion applies equally to the other forms of hinged panels and associated illumination, projection, and imaging devices described herein. Cabling for the illumination devices and other sensors, etc. may be provided by wiring run through hollow channels within the hinged panels, booms and harness (not shown). In instances where the hinged panels 112 are detachable from the booms 108, electrical contacts may be placed on both sides of the hinged panel-boom junction so as to provide electrical continuity and avoid the need for separately coupled wirings (although such wired connections may be used).

Figure 12A:
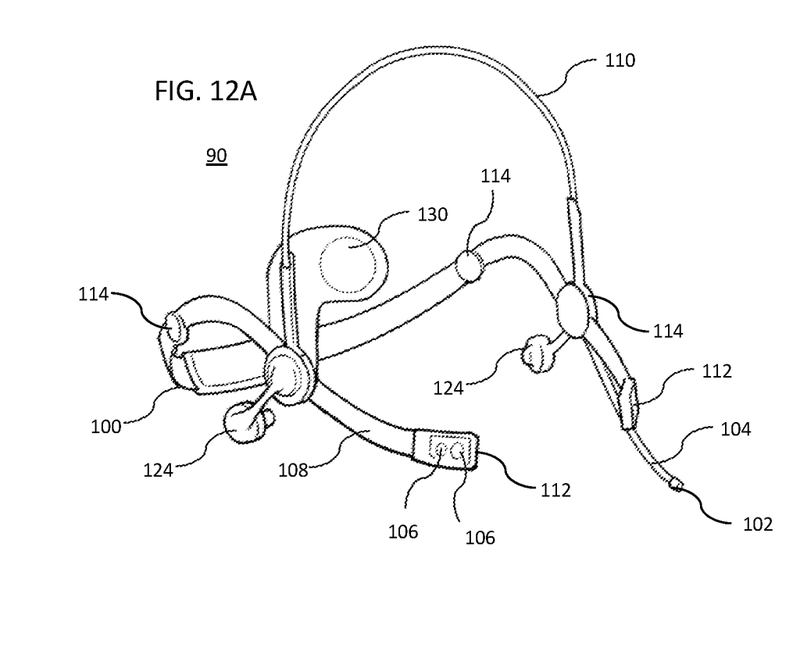
FIG. 12A is an isometric view of a head-mounted illumination device configured for hands-free operation in accordance with an embodiment of the present invention.
Figure 12B:
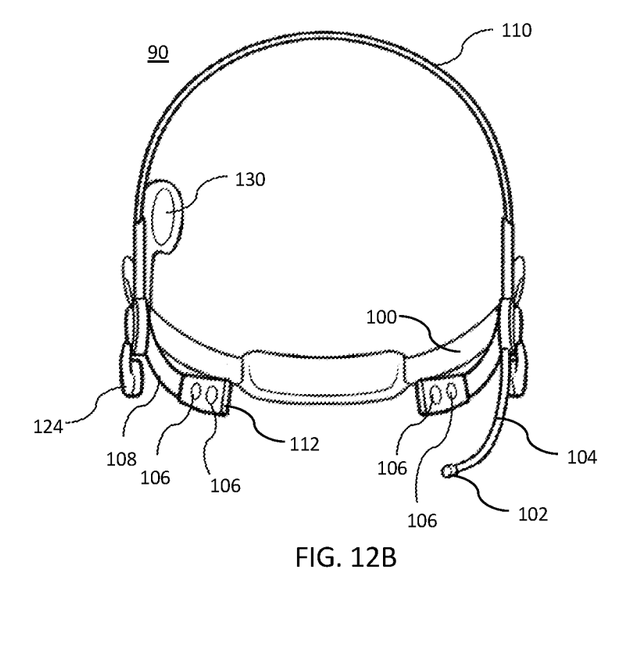
FIG. 12B is a front view of the head-mounted illumination device shown in FIG. 12A.
Figure 12C:
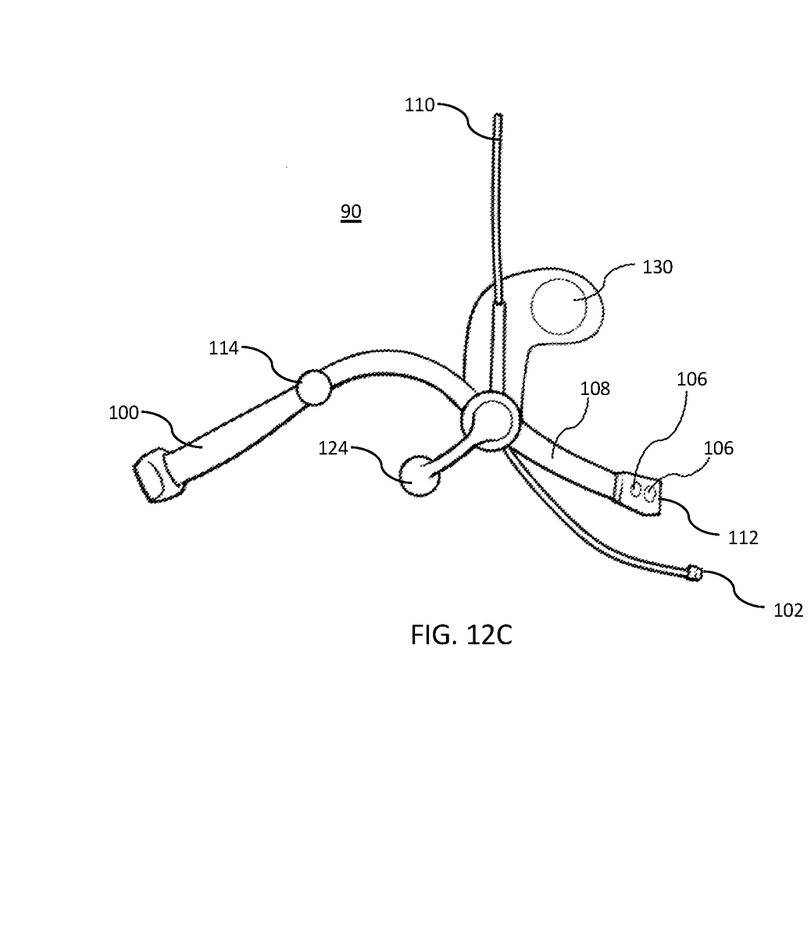
FIG. 12C is a partial side view of the head-mounted illumination device shown in FIG. 12A.
Figure 12D:
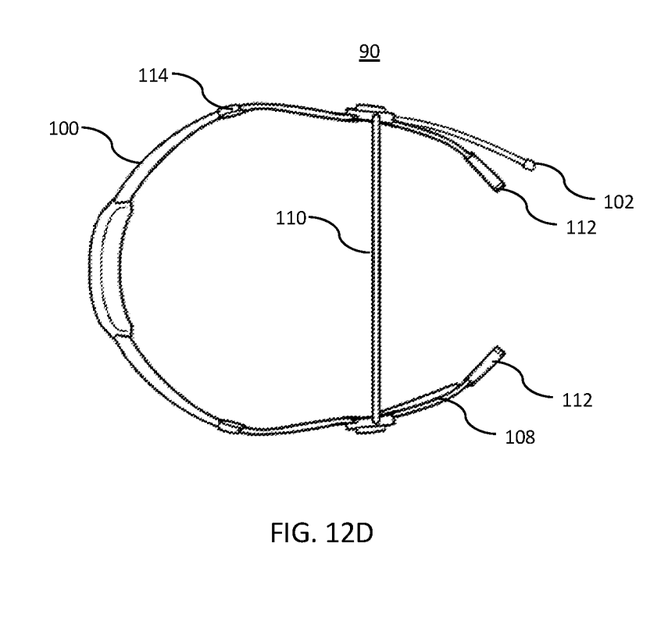
FIG. 12D is a top view of the head-mounted illumination device shown in FIG. 12A.

In some instances, the illumination may be provided by fiber optic cables terminating (e.g., with or without lens systems) at the hinged panels, in which case the illumination source may be positioned remotely from the hinged panel, for example worn elsewhere on the person of the user such as in a shoulder harness or utility belt. This would allow for larger power sources and illumination sources of significant luminance, while still providing the directional control afforded by the use of the harness and boom system of the present invention. Likewise, image capture components, such as imaging systems and storage devices could be worn on a shoulder harness or belt and the information obtained by image sensors positioned in the hinged panels 112 at the ends of booms 108 conveyed to such systems through the use of fiber optic waveguides routed through channels in the present headwear.

The illustrated example of the hinged panels 112 at the ends of booms 108 are sized so as to provide one or more LEDs 106 (and/or other sensors and/or projecting elements) approximately below the wearer's eye(s) and facing forward, in the direction the wearer is looking, so that the LEDs illuminate the area of interest to the wearer. The booms 108 are sized so as to position the hinged panels 112 so that they just rest on the wearer's cheeks, preferably over the zygomatic bones, without putting undue pressure thereon. Accordingly, frame 100 may be provided in various sizes to accommodate head sizes and shapes of different wearers, and/or they may be adjustable at one or more points to accomplish same. In some instances, frames and booms may be personalized to a wearer by creating a model, either physical or digital, of the wearer's head and face and fabricating a harness specifically to suit the wearer according to the dimensions provided from the model. Modern additive manufacturing processes (commonly known as 3D printing) make such customizations economically feasible even for consumer applications and custom harnesses could readily be produced from images of a wearer's head and face captured using computer-based cameras and transmitted to remote server hosting a Web service for purchase of the frame and accessories therefor. For example, following instructions provided by the Web-based service, a user may capture multiple still images and/or a short video of his/her head and face. By including an object of known dimensions (e.g., a ruler, a credit card, etc.) within the field of view of the camera at the approximate position of the user's head as the images are captured, a 3D model of the user's head and face can be created at the server. The user can then be provided with an opportunity to customize a harness to be sized to the dimensions of the model, selecting, for example, the number of booms, the type and number of hinged panels, with illumination or other accessories, the positions over the ears, etc. at which the harness will be worn, and other parameters of the to-be-manufactured harness. Once the customizations are specified, and payment collected, the frame specification may be dispatched to a manufacturing facility at which the harness is fabricated.

The frame 100 may include one or more hinge points 114, one or more on each side, about which sections of the frame may articulate so as to allow for a comfortable fit on the wearer. This may be especially important in frames that are not fabricated for personalized fit, so as to allow individual wearers to achieve a comfortable fit. The frame 100 may be worn next to the head, beneath a helmet 118. Accordingly, by allowing the frame to articulate in several places, the fit of the frame may be adjusted to accommodate the presence of the helmet and its associated retention straps, as well as other helmet-worn accessories such as a screen of a head-up display 120 (see FIG. 12E).

The hinge points 114 may be purely friction fit adjustments in which the relative friction between opposing cylindrical ribs is sufficient to keep the relative orientation of two hinged members constant during wear. Or, the hinge points may incorporate ratchet fittings that provide interlocking gear-like rings to assure that the relative positions of two members will not change with respect to one another unless a relatively significant force is applied. Other hinged arrangements may be used at points 114, such as swivel torque hinges, circle rotational hinges, click and pawl mechanisms, etc. In some cases, the hinge points 114 are fitted with O-rings to prevent moisture from intruding. In some embodiments additional hinge points may be provided along booms to allow the frame to be folded into a compact configuration with the booms folded inwards towards the rear of the frame. This allows easy storage of the device while preventing accidental damage to the booms. Additionally, one or more grip points along the inner surface of each boom or other parts of frame 100 may be fitted with silicone pads for contacting the wearer's skin. The pads assist in reducing slipping of the harness when worn, and also distribute pressure over a larger surface area than might otherwise be the case if they were not present. While silicone pads are preferred, pads made of other materials, e.g., cork, may be used.

Figure 12E:
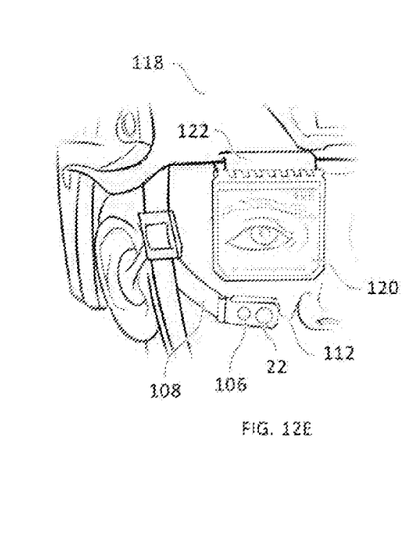
FIG. 12E shows the use of a heads up display with the head-mounted illumination device shown in FIGS. 12A-12D.

One or more LEDs 106 may be included in each hinged panel 112 at the end of each boom 108. In addition to the LED(s), the hinged panels 112 may include heads up display (HUD) projection optics oriented towards the wearer's eye to project information on a HUD screen 120 disposed in front of the wearer's eye(s). The screen 120 may be secured to helmet 18 on a hinge 122 so that it can be swiveled out of the wearer's line of sight when not in use, or it may exist in the form of a screen worn in front of the wearer's eyes in a fashion similar to a pair of spectacles. Alternatively, the projection optics may be oriented away from the user so that images can be projected onto a surface in front of the user. A power source and telemetry transmitter (e.g., for HUD data and audio communications) may be included in the frame 100 and/or a helmet 118 and attached to the various illumination and video elements, microphone(s), and earpiece(s) via one or more wire leads within the harness.

The frame 100 may further support one or more communication earpieces 124. Together with one or more microphones, which may be supported on one or more booms 108 or elsewhere on frame 100, the earpiece and microphone allow for communications to/from the wearer. The illumination devices, microphones, and other controlled elements may be configured for hands-free operation using the switch 102 positioned at the end of a boom 104 so as to be flush against the wearer's face (or nearly so), over the masseter muscle so that clenching/flexing of the jaw activates the switch. The switch 102 is electrically connected to control electronics and/or the controlled elements in the fashion described above. Alternatively, or in addition, earpiece and microphone elements may be communicatively connected to a transceiver carried elsewhere on the wearer's person, either using wired or wireless connections. In other embodiments, the earpiece and/or microphone may be eliminated, and audio communications facilitated through bone conduction elements. Portions of the frame 100 are in contact with the wearer's head. Hence, rather than an earpiece, a bone conduction headphone that decodes signals from a receiver and converts them to vibrations can transmit those vibrations directly to the wearer's cochlea. The receiver and bone conduction headphone(s) may be embedded directly in the frame 100, or in some cases the receiver may be external to the frame. One or more bone conduction headphones may be provided. For example, the headphone(s) may be similar to bone conduction speakers employed by scuba divers and may consist of a piezoelectric flexing disc encased in a molded portion of the frame 100 that contacts the wearer's head just behind one or both ears. Similarly, a bone conduction microphone may be provided in lieu of a boom microphone.

Figure 13:
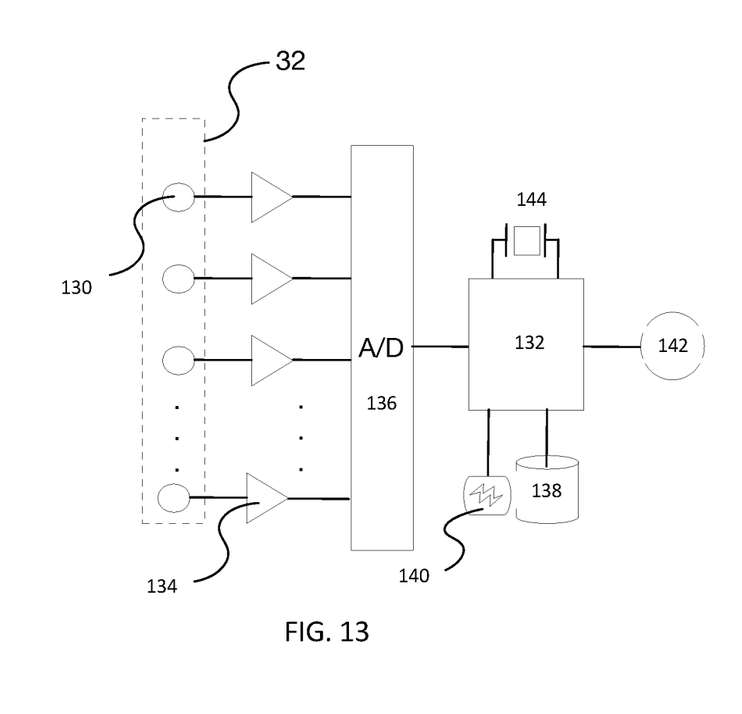
FIG. 13 illustrates an example of a sensor package arrangement for optional use with the head-mounted illumination device of the present invention.

In some embodiments, frame 100 may include a sensor package 130 that allows for monitoring of the wearer's vital statistics. A power source and telemetry transmitter (not shown) may be included in frame 100 and attached to the sensor package via one or more wire leads. Thus, even with a helmet removed, the sensors package 130 can continue to relay information concerning the wearer's vital statistics and other monitored biometrics via the telemetry transmitter, because frame 100 remains attached to the wearer.

The sensor package may include a sensor pads constructed of conductive fabric that contact the wearer at or near the temple. Additional sensor pads may be integrated in the frame 100 or may be included in the retractable strap positioned over the head of the wearer. This would allow for additional sensor readings for electrophysiological or other noninvasive monitoring of the wearer.

The sensor pad(s) and associated electronics may allow for detection of electrical signals in the manner described by von Rosenberg, W. et al., "Smart Helmet: Monitoring Brain, Cardiac and Respiratory Activity," Conf. Proc. IEEE Eng. Med. Biol. Soc. 2015, pp. 1829-32 (2015). For example, as shown in FIG. 13, sensor pad(s) 130 may be attached by electrical leads to a processor 132, e.g., via associated amplifiers 134, analog-to-digital converters 136, etc., which samples the signals from the sensor pads periodically. A record of the sampled signals may be stored locally, e.g., in a suitable writable memory 138 such as a flash memory, and also may be transmitted to a remote monitoring location via a telemetry transmitter 140 and an associated antenna. Alternatively, the telemetry may be transmitted only when the transmitter is activated, e.g., by an on-scene paramedic, or by the wearer him/herself. Upon command, any stored samples may be similarly transmitted so that a history of the wearer's biometric and vital signs can be analyzed by a physician or other person at the remote monitoring station, or locally via an output port 142.

In some embodiments, the sensor package may also include one or more accelerometers 144 which provide inputs to processor 132 concerning rapid accelerations/decelerations of the wearer's head. Such measurements may be important when assessing possible traumatic brain injuries, cervical spinal injuries, and the like.

Although not shown in the various views, a power source for the electronics is provided and may be housed within the frame 100 or located external thereto (e.g., worn on a vest or pack). In some cases, a primary power source may be located external to the frame 100 and a secondary power source provided integral thereto. This would allow the primary power source to be decoupled from the harness, which would then revert to using the secondary power source (e.g., a small battery or the like), at least temporarily. This would allow for continuous monitoring of the biometric and vital signs and provision of related telemetry. Primary power may later be restored by an attending medic using a transportable power supply. To facilitate this operation, the harness may be provided with one or more ports allowing connection of different forms of power supplies.

Beyond comfort, the present head-worn illumination device offers beam separation/brightness consistency when closing distance/peering. For example, by having separate illumination sources on booms on either side of a wearer's face, with each being mounted on a pivotable, hinged panel, a wearer can aim each illuminations source independently so as to provide for combining the illumination of the respective beams at a desired point in front of the wearer (e.g., corresponding to an area of interest to the wearer), so as to maximize the provided illumination at that point. Then, by moving his/her head towards/away from the area of interest, the user can provide a form of brightness control over that area of illumination. As the user moves his/her head, the beams provided by the illumination sources will separate, thereby adjusting the effective amount of illumination at the area of interest. In some embodiments, haptic feedback may be used for various indications, e.g., low battery, etc. Embodiments of the head-worn illumination device may also support other components of a head-worn "system" that includes integrated eyewear components, disposable masks and caps, heads-up display, sensors, data capture components, etc.

The illumination device 90 is configured for hands-free operation using the switch 102 positioned at the end of a boom 104 so as to be flush against the wearer's face (or nearly so), over the masseter muscle so that clenching/flexing of the jaw activates the switch. The switch 102 is electrically connected to control electronics and/or the illumination elements in the fashion described above. Alternatively, the switch may be worn on the user's face independently, for example using a temporary adhesive, and connected via any of the wireless communication means discussed above to a control unit so as to control the illumination/imaging elements.

Illumination devices of the kind described herein, and especially the frame, booms, and hinged panels thereof, may be fashioned from a variety of materials, including but not limited to plastics (e.g., zylonite), metals and/or metal alloys, carbon fiber, wood, cellulose acetates (including but not limited to nylon), natural horn and/or bone, leather, epoxy resins, and combinations of the foregoing. Fabrication processes include, but are not limited to, injection molding, sintering, milling, and die cutting. Alternatively, or in addition, one or more additive manufacturing processes, such as extrusion, vat photopolymerization, powder bed fusion, material jetting, or direct energy jetting, may be used to fashion the illumination device and/or components thereof.

The imaging devices associated with embodiments of the invention may include still image and or video cameras. As such, the imaging devices are well suited to photo and/or video capture and may also be used as imaging portions of optical scanners. For example, the imaging device may be employed under the control of a scanning application running on a host processor (e.g., processor 132), and used to image optically encoded information in the form of a bar code, QR code or similar machine-readable item. Machine-readable codes of this nature are ubiquitous and may be associated with any number of things that the wearer of the illumination/imaging device may need or use. For example, in the case of a field medic, the medic may need to administer drugs, intravenous fluids, or take other actions with respect to a casualty. By scanning the packaging associated with the drugs to be administered, for example by training the imaging device onto the packaging and operating the switch 130 by clenching his/her jaw, the medic may cause a bar code or other machine-readable label printed on the packaging to be recorded. This information may then be wirelessly transmitted to a remote location where it can be associated with the casualty's medical records, thereby alleviating the need for the medic to separately perform this operation. Similarly, workers in a warehouse or similar facility may scan a machine-readable label using the present illumination/imaging device and the associated data may be transmitted to a logistics system to update the status of an associated item. And, in some instances, the information flow may be bidirectional. For example, a repair technician may scan a machine-readable label associated with an item under inspection and, responsive to transmission of that information to a remote facility, troubleshooting information may be transferred to the technician's handheld device or even streamed for playback via a HUD display worn by the technician. Another form of bi-directional communication may involve the wearer transmitting location information (e.g., as provided by a personal GPS or other location finding unit) in response to a clench interaction via switch 130, and having directional information relayed back (e.g., via display on a HUD unit) so as to keep the wearer progressing on a defined route.

Thus, systems and methods for hands-free activation/deactivation of illumination, imaging, and/or other systems, in particular, head-worn illumination, imaging, and/or other systems have been described.

What is claimed is:

1. An actuator element for a hand-free switch system, said actuator element comprising a moveable portion and a switch having a control element responsive to movement of said moveable portion to effect a change in an output of said switch, said switch hingibly attached on a helmet by a biased arrangement, said biased arrangement configured to keep the switch in one or another of a first position or a second position, said first position being with the switch worn adjacent an exterior of a wearer's face so as to facilitate activation/deactivation of the switch by movement of the moveable portion in response to flexing of muscles associated with the wearer's jaw, and said second position being with said switch is moved away from the wearer's face by an amount sufficient to engage a detent that prevents its return to the first position adjacent the wearer's face unless manually adjusted by the wearer.

2. The actuator element of claim 1 further including a haptic feedback element incorporated with said switch.

3. The actuator element of claim 1 wherein the actuator element is integral to the helmet.

4. The actuator element of claim 1 further comprising a controller that includes a processor and a memory, said memory storing instructions for execution by the processor, wherein said instructions, when executed by said processor, cause said processor to recognize a first sequence of outputs from the switch as indicating one of a number of commands for operating a controlled element.

5. The actuator element of claim 4, wherein the controlled element is a cursor of a computer system.

6. The actuator element of claim 4 wherein the controlled element is an illumination device.

7. The actuator element of claim 4 wherein the controlled element is an illumination element of an illumination device.

8. The actuator element of claim 4 wherein the controlled element is an imaging device.

9. The actuator element of claim 1 wherein said switch is sealed against an environment in which the actuator element is located.

10. The actuator element of claim 1 wherein said switch is positioned on said helmet by a telescoping element.

11. The actuator element of claim 10 further comprising a controller that includes a processor and a memory, said memory storing instructions for execution by the processor, wherein said instructions, when executed by said processor, cause said processor to recognize a first sequence of outputs from the switch as indicating one of a number of commands for operating a controlled element.

12. The actuator element of claim 11, wherein the controlled element is a cursor of a computer system.

13. The actuator element of claim 11 wherein the controlled element is an illumination device.

14. The actuator element of claim 11 wherein the controlled element is an illumination element of an illumination device.

15. The actuator element of claim 11 wherein the controlled element is an imaging device.

\* \* \* \* \*